United States Patent
Land et al.

(10) Patent No.: US 10,322,623 B2
(45) Date of Patent: Jun. 18, 2019

(54) ROOF CLOSURE ASSEMBLY

(71) Applicant: Inalfa Roof Systems Group B.V., Oostrum (NL)

(72) Inventors: Frijke Irene Land, Grubbenvorst (NL); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/816,284

(22) Filed: Nov. 17, 2017

(65) Prior Publication Data
US 2018/0147921 A1    May 31, 2018

(30) Foreign Application Priority Data

Nov. 28, 2016  (EP) .................................... 16200972

(51) Int. Cl.
| | | |
|---|---|---|
| *B60J 7/057* | (2006.01) | |
| *B60J 7/02* | (2006.01) | |
| *B60J 7/043* | (2006.01) | |
| *B60J 7/00* | (2006.01) | |

(52) U.S. Cl.
CPC ............ *B60J 7/0573* (2013.01); *B60J 7/022* (2013.01); *B60J 7/043* (2013.01); *B60J 7/0084* (2013.01)

(58) Field of Classification Search
CPC ........... B60J 7/0573; B60J 7/022; B60J 7/043
USPC ..................................... 296/216.01–224, 214
See application file for complete search history.

(56) References Cited

U.S. PATENT DOCUMENTS

| | | | | |
|---|---|---|---|---|
| 3,874,722 A | * | 4/1975 | Pickles .................. | B60J 7/0573 296/223 |
| 4,390,203 A | * | 6/1983 | Lutz ........................ | B60J 7/057 296/214 |
| 4,468,063 A | * | 8/1984 | Yukimoto .................. | B60J 7/04 296/223 |
| 5,020,850 A | * | 6/1991 | Bienert .................... | B60J 7/057 296/223 |
| 5,104,178 A | | 4/1992 | Bienert | |

(Continued)

FOREIGN PATENT DOCUMENTS

| | | |
|---|---|---|
| DE | 4014487 C1 | 8/1991 |
| DE | 4012635 A1 | 10/1991 |

(Continued)

*Primary Examiner* — Dennis H Pedder
(74) *Attorney, Agent, or Firm* — Steven M. Koehler; Westman, Champlin & Koehler, P.A.

(57) ABSTRACT

A roof closure assembly for a vehicle includes a frame configured to be fixed to the vehicle roof and having an upper and lower side. A movable closure for a roof opening is movably supported by a movable support mechanism on the frame. An operating device includes at least one drive motor, at least a guide rail including the movable support mechanism for the closure and an elongate connecting member attached to the movable support mechanism and in engagement with the drive motor to enable the drive motor to drive the closure to move between a closed position closing the roof opening and an open position opening the roof opening at least partly. The frame comprises a through-hole providing communication between the upper and lower side of the frame. The drive motor is mounted to a lower side of a motor support such that the drive motor is accessible through the through-hole.

16 Claims, 5 Drawing Sheets

(56) References Cited

U.S. PATENT DOCUMENTS 8,348,240 B2 * 1/2013 Butsuen ................ B60J 7/0573
                                                                                                                    254/342
2016/0288631 A1 * 10/2016 Parkila ................... B60J 7/0573

FOREIGN PATENT DOCUMENTS

| JP | 11240333 | A | * | 9/1999 |
| JP | 5185693 | B2 | * | 4/2013 |

* cited by examiner

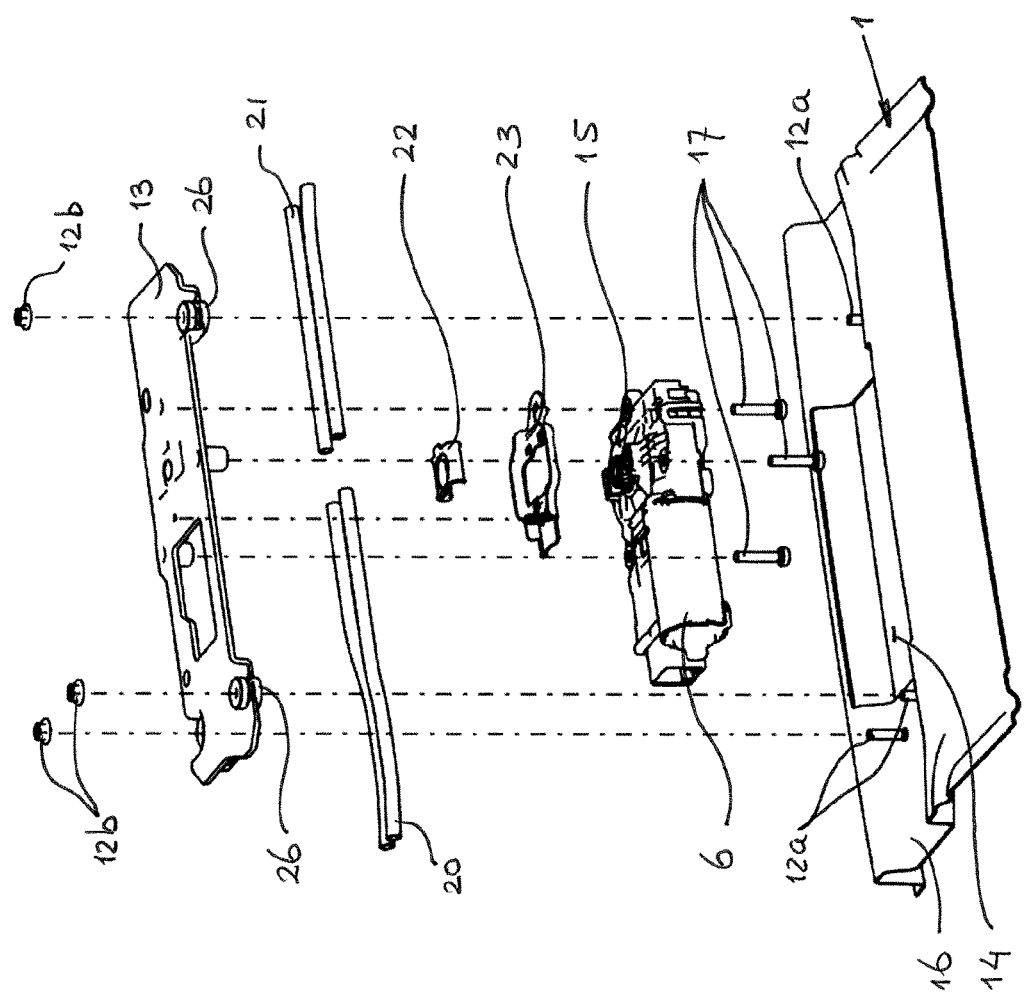

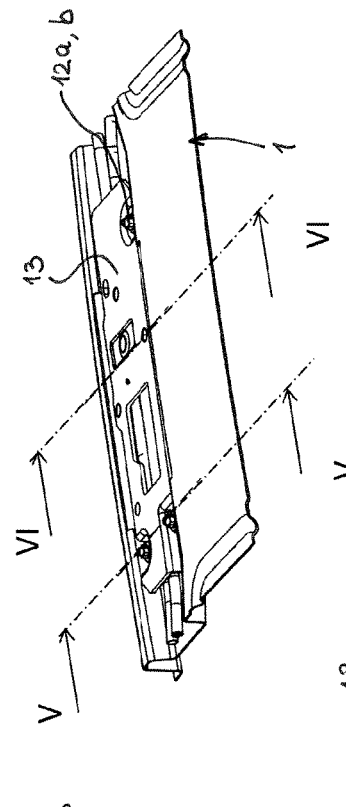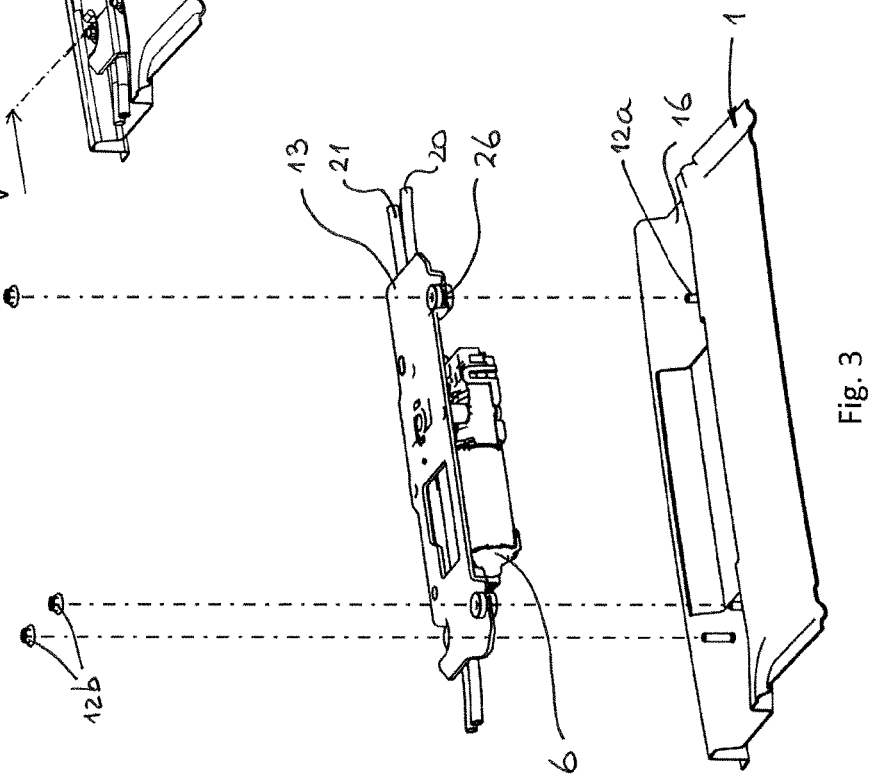

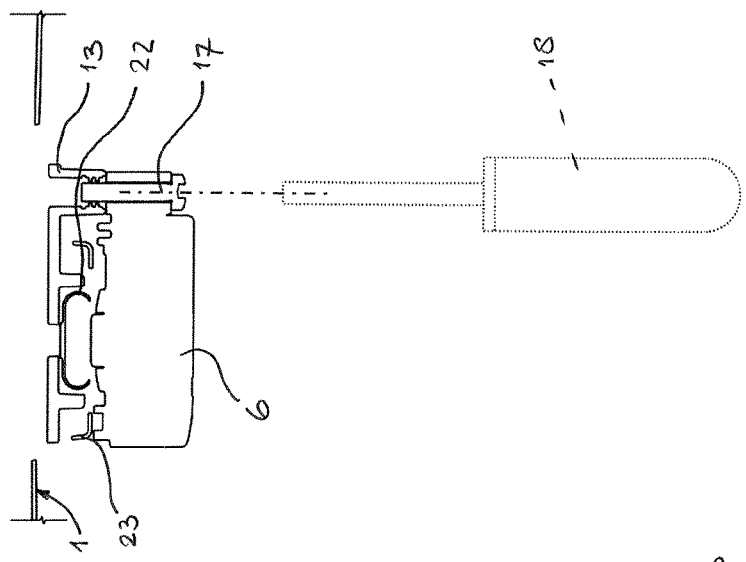
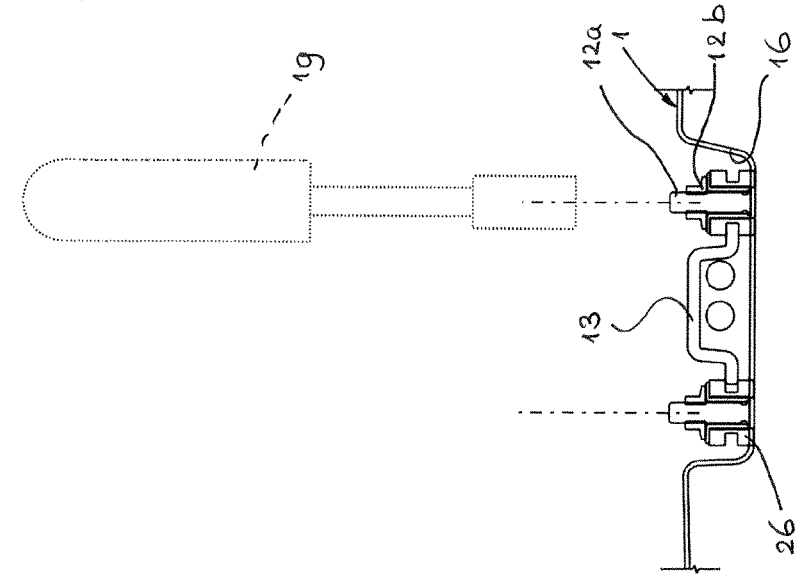
Fig. 5
Fig. 6

ROOF CLOSURE ASSEMBLY

BACKGROUND

The discussion below is merely provided for general background information and is not intended to be used as an aid in determining the scope of the claimed subject matter.

Aspects of the invention relate to a roof closure assembly for a vehicle having an opening in its fixed vehicle roof.

In some types of roof closure assemblies known today, parts of the assembly are mounted to the upper side of the frame, others to the lower side. The movable support mechanism for the closure and its guide rail must of course be mounted on the upper side of the frame. The drive motor, however, is mounted to the lower side of the frame as this part must be accessible for servicing, and this can only be done from below. As a result, the elongate connecting member extends partly below and partly above the frame and must therefore be threaded through the frame which is undesirable as it makes assembling more difficult and poses a leakage risk as the connecting member often extends in a so-called wet portion of the frame used for draining water to a drain outlet.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof closure assembly comprises: a frame configured to be fixed to the vehicle roof and having an upper and lower side, the frame comprising a through-hole providing communication between the upper and lower side of the frame, a movable closure for a roof opening, an operating device on the frame movably supporting the closure, said support mechanism including at least one drive motor, at least a guide rail including a movable support mechanism for the closure and elongate connecting members attached to the movable support and in engagement with the drive motor to enable the drive motor to drive the closure to move between a closed position closing the roof opening and an open position opening the roof opening at least partly, wherein the drive motor is mounted to a lower side of a motor support, and the motor support, with the motor attached to its lower side in line with the through-hole, and the connecting members are positioned on and fastened from the space next to the upper side of the frame, such that the drive motor is accessible through the through-hole.

By mounting the motor support, the connecting member and the movable support mechanism all to the upper side of the frame, no threading of the connecting member through the frame is necessary anymore, which is favorable. Furthermore, it is not required anymore during production to turn the frame 180 degrees to mount (i.e. position and fasten) some parts to the upper and some parts to the lower side of the frame. Furthermore, in roof closure assemblies having one drive motor, there is only a single through-holes required for the drive motor, instead of two through-holes for the two connecting members that are generally being used. It is also easy to position the drive motor and thus the vertical through-hole outside the wet portion 28 of the frame thereby avoiding any leakage risk. Even if the through-hole is in the wet portion 28, it is easier to seal it, for example by sealing means connected to the motor support.

Due to the vertical through-hole, the drive motor remains accessible from below which is important for servicing it. If the motor is mounted to the motor support by means of fastening members which are accessible from below after the motor support with its drive motor is mounted to the frame, it is possible to demount the drive motor and also remove it easily.

The motor support may be a plate-shaped motor support to keep the building height as low as possible.

Preferably, the through-hole is of such dimensions that the drive motor can either be mounted to the motor support such that it extends at least partly below the through-hole if there is sufficient room below the frame, or it can be removed from the motor support through the through-hole for servicing during use.

To facilitate mounting the motor support to the frame, the frame may be provided with pre-mounted screw bolts projecting upwardly from the frame and the motor support comprising aligning holes, the motor support being mounted by nuts fitting with the screw bolts. Of course, it is also possible to provide the frame with nuts, for example to integrate them in a plastic frame, and to fix the motor support by bolts screwed into the nuts.

An output gearwheel of a gearbox integrated with the drive motor may project upwardly, the elongated connecting member being a toothed drive cable guided along a circumference of the output gearwheel and being in engagement with it, and extending in a tube or channel away from the gearwheel.

The motor support may be mounted to the frame with interposition of one or more additional vibration isolating members to prevent any vibrations of the drive motor to be picked up and possibly be amplified by the frame.

An aspect of the invention also includes a method of assembling a roof closure assembly for a vehicle roof, said roof closure assembly comprising a frame having an upper and lower side, a movable closure for a roof opening, supported by the frame through a movable support mechanism, and an operating device including at least one drive motor, at least a guide rail including the movable support mechanism for the closure and an elongate connecting member attached to the movable support mechanism and in engagement with the drive motor enabling the closure to move between a closed position closing the roof opening and an open position opening the roof opening at least partly.

The method includes:
  forming the frame with a vertical through-hole providing communication between the upper and lower side of the frame,
  mounting the drive motor to a lower side of a motor support,
  positioning and fastening the motor support, with the motor attached to its lower side substantially in line with the vertical through-hole in the frame, the connecting member and the movable support mechanism to the upper side of the frame.

Assembling is further facilitated if the method also comprises: pre-mounting the motor support and motor, the connecting member and optionally also the movable support mechanism and the guide rail into a pre-assembly that is subsequently mounted to the frame. This pre-mounting can be done on a separate sub-assembly line parallel to mounting operations on the frame, and the time required to mount the pre-assembly to the frame can be shorter than mounting parts separately to the frame, especially if the pre-assembly also includes the guide rail, and if the pre-assembly is mounted to a fixture before it is mounted to the frame.

In the latter case, settings and adjustments can be made before mounting the pre-assembly to the frame thereby further reducing production time in the main production line.

The fixture may be removed and reused after mounting the sub-assembly to the frame, so that no additional parts on the frame are used.

BRIEF DESCRIPTION OF THE DRAWINGS

Aspects of the invention will further be elucidated with reference to the accompanying drawings showing an embodiment of the roof closure assembly by way of example.

FIG. 2 is an exploded view of the parts in detail II in FIG. 1.

FIG. 3 is a view corresponding to that of FIG. 2, but showing the parts of the operating device in assembled condition.

FIG. 4 is a view corresponding to that of FIG. 3, but showing all parts assembled to the frame.

FIGS. 5 and 6 are sectional views according to the lines V-V and VI-VI, respectively, together with tools in dotted lines for mounting the motor support and for demounting the drive motor.

DETAILED DESCRIPTION OF THE ILLUSTRATIVE EMBODIMENT

Figure 1:
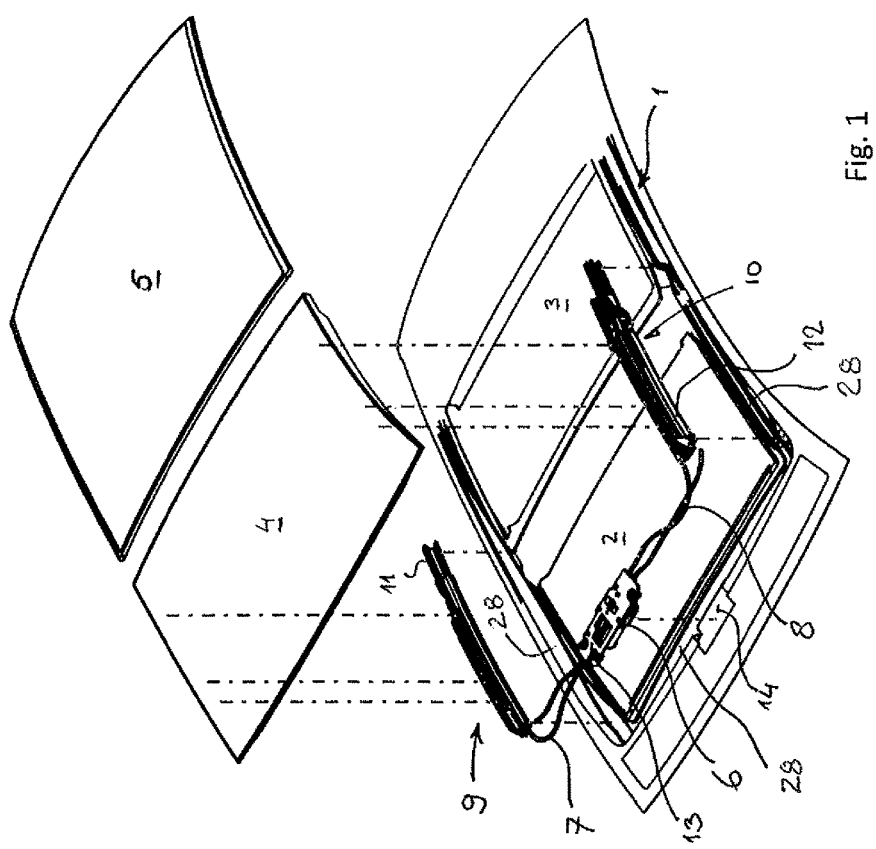
FIG. 1 is a schematic perspective exploded view of a roof closure frame and operating device for a roof closure assembly.

FIG. 1 schematically shows parts of a roof closure assembly for a fixed roof of a vehicle (not shown). A frame 1 of the roof closure assembly may be attached to the lower or upper side of the fixed roof having a roof opening to be opened or closed by the closure, and the frame then only having a passage opening below the roof opening. On the other hand it is also possible that a frame 1 (or a roof plate attached to it) replaces a part of or the whole fixed roof of the vehicle and has its own roof opening or roof openings to be closed by a closure. FIG. 1 shows the frame 1 having two roof openings or passage openings 2 and 3. The closure or closures to close these openings 2, 3 may for example be rigid, at least partly transparent panels 4, 5 (shown schematically by dotted lines), for example from glass or plastic. For example, the front panel 4 may be a panel that is movable between a closed position closing the roof opening 2 and an open position opening the opening 2 at least partly, for example by tilting it to a venting position, and/or by sliding it rearwardly above the rear panel 5. The rear panel 5 may also be movable, or may be fixed in its position closing the rear roof opening 3.

An operating device for the front panel 4 is shown in assembled condition in FIG. 1 and includes a drive motor 6, two elongate connecting members 7, 8, here two drive cables fitted in guide tubes, two movable support mechanisms 9, 10, each movably supporting panel 4 at a side edge thereof, and two guide rails 11, 12 extending on opposite side edges of the roof opening 4 and slidably supporting the respective support mechanisms 9, 10. As is shown in FIG. 1, all these parts are mounted to the frame 1 from above, and thus mainly on the upper side of frame 1.

FIGS. 2, 3 and 4 show how drive motor 6 is mounted to frame 1, in this case to a front beam of frame 1. It is mounted to the front beam of frame 1 through a motor support 13, here a plate-shaped motor support 13 which is bolted to frame 1 by bolts 12a fixed to frame 1 and nuts 12b clamping motor support 13 to frame 1. Vibration isolating members 26 may be positioned between motor support 13 and frame 1 to isolate vibrations from drive motor 6 to frame 1. Drive motor 6 is mounted to the lower side of motor support 13. Frame 1 is provided with a vertical through-hole 14. When motor support 13 and drive motor 6 are in their mounted position, drive motor 6 projects through through-hole 14 which is thus of sufficient dimensions to allow passage of drive motor 6.

As is shown in FIGS. 4 and 6, drive motor 6 is positioned completely or almost completely below through-hole 14 and only a drive gear wheel 15 of drive motor 6 is positioned above through-hole 14, so that connecting members 7, 8 may extend in a straight line above frame 1 (here in a depression 16 of frame 1) while being in engagement with drive gear wheel 15 of drive motor 6 positioned substantially below frame 1.

In principle it is possible that drive motor 6 is positioned within or above through-hole 14. The function of through-hole 14 is to allow drive motor 6 to be serviced during the lifetime of the vehicle, which can only be done from the compartment of the vehicle, i.e. from below frame 1. Thus, to allow mounting the operating device to be mounted from above and to allow servicing of drive motor from below, motor support 13 and the through-hole 14 are used to obtain this combination of qualities. To allow demounting of drive motor 6, it is mounted to motor support 13 by bolts 17 which are accessible by a tool 18 (see FIG. 6) from below. Of course, during use frame 1 and drive motor 6 are covered by a removable lining, panel or the like.

FIG. 5 illustrates that motor support 13 is mounted by fixing means that are accessible from above (i.e. from the space next to the upper side of the frame) by means of a tool 19. The bolts 12a protrude from the upper side of frame 1 and nuts 12b are brought into engagement with bolts 12a and tightened by tool 19 so as to clamp motor support 13 between nuts 12b and the upper side of frame 1. This means that motor support 13 and its fixing means are positioned both on the upper side of frame 1. Thus, positioning and fastening takes place on the same side of frame 1, so that it does not have to be turned 180 degrees, or engaged by tools from two sides.

FIG. 2-4 show guide tubes 20, 21 to guide elongate connecting members 7, 8. These guide tubes 20, 21 are only interrupted at the position of gear wheel 15 of drive motor 6, so that connecting members 7, 8, which have a tooting on their outer surface, can come into engagement with gear wheel 15 such that they are moved along their longitudinal axes to drive respective support mechanisms 9, 10 in order to move panel 4.

A guide member 22 is used to keep connecting members 7, 8 in engagement with gear wheel 15 (see also FIG. 6) and a mounting member 23 fixes guide member 22 in position and aligns the guide tubes 20, 21 together with depressions on the lower side of motor support 13.

Figure 7:
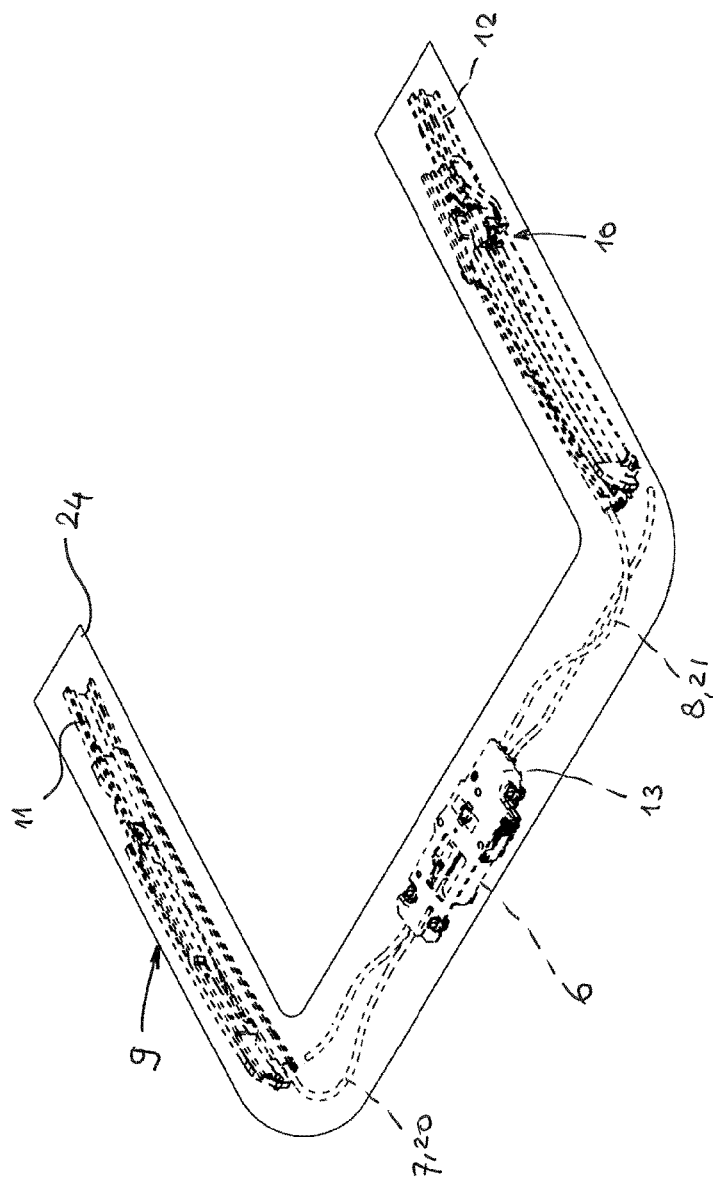
FIG. 7 is a view corresponding to that of FIG. 1, but illustrating the assembly of the operating device to the frame by means of a fixture.

FIG. 7 illustrates that a fixture 24 can be used to make a pre-assembly 25 of the operating device including drive motor 6, motor support 13, connecting members 7, 8, support mechanisms 9, 10 and guide rails 11, 12. All these parts are fixed in the correct relative position (when not already done by their fastening members) by fixture 24 and can be mounted as a pre-assembly to frame 1. It is then possible to remove fixture 24 and use it again for another closure roof assembly, although it is conceivable that a fixture is used that remains permanently fixed to frame 1. Such fixture then functions as a sub-frame. It will then be positioned below the operating device, not above as is shown in the removable version of FIG. 7. Due to this fixture the mounting time in the main production line is minimised and many manipulations can be performed outside the main production line in parallel, which increases production capacity.

The drive motor 6 is normally provided with a socket for an electric plug of wire cables of the electric and electronic control system of the vehicle and this plug will be plugged in the socket of electric drive motor 6 if it is mounted to the frame and is accessible from below frame 1 where the cable wire plug will temporarily be positioned before the roof closure assembly is mounted to the vehicle.

The invention is not limited to the embodiments described above and shown in the drawings, which may be varied in different manners within the scope of the appended claims.

For example it is possible that the drive motor and gearbox can be disassembled before removal from the motor support, so that the through-hole might be smaller than the vertical projection of the drive motor with integrated gearbox. Especially if the drive motor extends substantially completely below the vertical through-hole when in position, the through-hole may be somewhat smaller than the vertical projection of the drive motor, if it can be inserted through the through-hole by manipulation in different angles or positions. The through-hole in the frame may remain partly open, or may be covered completely by the motor support. The invention is useful for all type of roofs, such as roofs with rigid panels (spoiler roofs, sliding roofs, tilt-sliding roofs etc.), folding roofs, slatted roofs and the like. The motor may be placed in any position, such as a front or rear beam, a centre beam if available. One or a plurality of drive motors may be attached to a single motor support and may be positioned in line with one through-hole or a plurality of through-holes. The guide tubes for the elongate connecting members may be replaced by guide channels formed in frame 1, which is especially suitable with a plastic injection moulded frame where the guide channels can easily be integrated.

The invention claimed is:

1. A roof closure assembly for a vehicle having an opening in its fixed vehicle roof, comprising:
 a frame configured to be fixed to the vehicle roof and having an upper side and a lower side, the frame comprising a through-hole providing communication between the upper side and the lower side of the frame,
 a movable closure for a roof opening,
 an operating device on the frame movably supporting the closure, said operating device including at least one drive motor, at least a guide rail including a movable support mechanism for the closure and an elongate connecting member attached to the movable support mechanism and in engagement with the drive motor to enable the drive motor to drive the closure to move between a closed position closing the roof opening and an open position opening the roof opening at least partly,
 wherein the drive motor is mounted to a lower side of a motor support, and wherein the motor support and the connecting member are positioned on the upper side of the frame and fastened to the frame by first fastening members which are manipulated from a space next to the upper side of the frame, such that the drive motor is in line with the through-hole and is accessible from the lower side of the frame and through the through-hole.

2. The roof closure assembly of claim 1, wherein the motor support is a plate-shaped motor support.

3. The roof closure assembly of claim 1, wherein the through-hole is of such dimensions that the drive motor can be mounted or removed from the motor support through the through-hole.

4. The roof closure assembly of claim 1, wherein the drive motor extends at least partly below the through-hole in the frame to allow the drive motor to be serviced from a compartment of the vehicle.

5. The roof closure assembly of claim 1, wherein the drive motor is mounted to the motor support by one or more second fastening members which are accessible through the through-hole in the frame.

6. The roof closure assembly of claim 1, wherein an output gearwheel of a gearbox integrated with the drive motor projects upwardly, the elongated connecting member being a toothed drive cable guided along a circumference of the output gearwheel and being in engagement with it, and extending in a tube or channel away from the gearwheel.

7. The roof closure assembly of claim 1, wherein the frame is provided with wet portions reachable for drain water, and wherein the motor support is positioned outside the wet portions.

8. The roof closure assembly of claim 1, wherein the motor support is mounted to the frame with interposition of one or more vibration isolating members.

9. A method of assembling a roof closure assembly for a vehicle roof, said roof closure assembly comprising a frame having an upper side and a lower side, a movable closure for a roof opening, supported by the frame through a movable support mechanism, and an operating device including at least one drive motor, at least a guide rail including the movable support mechanism for the closure and an elongate connecting member attached to the movable support mechanism and in engagement with the drive motor enabling the closure to move between a closed position closing the roof opening and an open position opening the roof opening at least partly, wherein the frame is provided with a through-hole providing communication between the upper and lower side of the frame, said method comprising:
 mounting the drive motor to a lower side of a motor support,
 positioning and fastening the motor support, the connecting member and the moveable support mechanism to the upper side of the frame so the drive motor is in line with the through-hole in the frame.

10. The method of claim 9, and further comprising: pre-mounting the motor support and motor, the connecting member and the movable support mechanism into a pre-assembly that is subsequently mounted to the frame.

11. The method of claim 10, wherein the pre-assembly also includes the guide rail.

12. The method of claim 10, further comprising mounting the motor support and the motor, the connecting member, the guide rail and the movable support mechanism as the pre-assembly to a fixture before it is mounted to the frame.

13. The method of claim 12, comprising removing and reusing the fixture after mounting the pre-assembly to the frame.

14. The method of claim 9, comprising mounting the motor to the motor support by means of fastening members which are accessible from below after the motor support and drive motor are mounted to the frame.

15. The method of claim 9, and further comprising: pre-mounting the motor support and motor, and the connecting member into a pre-assembly that is subsequently mounted to the frame.

16. The method of claim 10, further comprising mounting the motor support and the motor, the connecting member and the movable support mechanism as the pre-assembly to a fixture before it is mounted to the frame.

* * * * *